Figure 1:
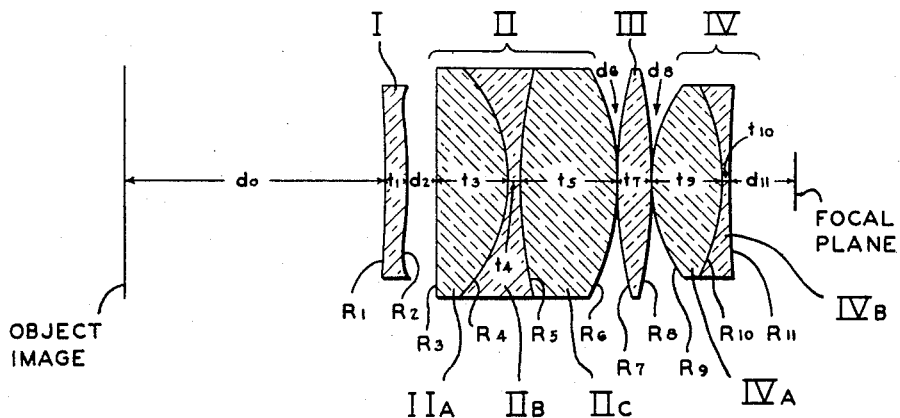

May 15, 1951   D. S. GREY   2,552,672
OPTICAL LENS SYSTEM
Filed May 18, 1946   3 Sheets-Sheet 1

| LENS | RADIUS | THICKNESS | $N_D$ | V |
|---|---|---|---|---|
| | | $d_0$=23.6489 | | |
| I | $R_1$= -23.6489<br>$R_2$= -4.1303 | $t_1$ = .1887<br>$d_2$ = .2354 | 1.5064 | 57.5 |
| II$_A$ | $R_3$= ∞<br>$R_4$= -1.2416 | $t_3$ = .5642 | 1.6102 | 58.6 |
| II$_B$ | $R_4$= -1.2416<br>$R_5$= 3.8202 | $t_4$ = .0894 | 1.7206 | 29.3 |
| II$_C$ | $R_5$= 3.8202<br>$R_6$= -1.8741 | $t_5$ = .7737<br>$d_6$ = .0010 | 1.6102 | 58.6 |
| III | $R_7$= 3.4609<br>$R_8$= -4.1386 | $t_7$ = .2861<br>$d_8$ = .0010 | 1.6102 | 58.6 |
| IV$_A$ | $R_9$= 1.2416<br>$R_{10}$= -1.6389 | $t_9$ = .5662 | 1.6102 | 58.6 |
| IV$_B$ | $R_{10}$= -1.6389<br>$R_{11}$= 13.9895 | $t_{10}$ = .0397<br>$d_{11}$ = .5232 | 1.6050 | 37.9 |

INVENTOR
David S. Grey
BY
Donald L. Brown
Attorney

May 15, 1951  D. S. GREY  2,552,672
OPTICAL LENS SYSTEM
Filed May 18, 1946  3 Sheets-Sheet 3

| LENS | RADIUS | THICKNESS | $N_D$ | V |
|---|---|---|---|---|
| | | $d_0$ = 6.2576 | | |
| I | $R_1$ = 1.3825<br>$R_2$ = -4.9540 | $t_1$ = .1546<br>$d_2$ = .2735 | 1.5104 | 56 |
| II A | $R_3$ = ∞<br>$R_4$ = -.7822 | $t_3$ = .2853 | 1.5104 | 56 |
| II B | $R_4$ = -.7822<br>$R_5$ = 1.5853 | $t_4$ = .04756<br>$d_5$ = .02021 | 1.600 | 33 |
| II C | $R_6$ = 1.6513<br>$R_7$ = -1.3211 | $t_6$ = .2342<br>$d_7$ = .01189 | 1.6153 | 58.6 |
| III | $R_8$ = 1.4325<br>$R_9$ = -4.2462 | $t_8$ = .1641<br>$d_9$ = .01189 | 1.5104 | 56 |
| IV | $R_{10}$ = ∞<br>$R_{11}$ = ∞ | $t_{10}$ = .03567<br>$d_{11}$ = .7005 | 1.500 | 56 |

INVENTOR
David S. Grey
BY Donald L. Brown
Attorney

Patented May 15, 1951

2,552,672

UNITED STATES PATENT OFFICE 2,552,672

OPTICAL LENS SYSTEM

David S. Grey, Weston, Mass., assignor to Polaroid Corporation, Cambridge, Mass., a corporation of Delaware Application May 18, 1946, Serial No. 670,712

20 Claims. (Cl. 88—57)

This invention relates to lens systems, and more particularly to lens systems of the type which may be employed, for example, as objectives in cameras or as projection systems in motion picture or television projectors.

It is one object of the present invention to provide a novel lens system comprising two or more spheric surfaces contributing to the spherical aberration of the system and at least one aspheric surface for correcting said spherical aberration, the lens elements of said system being so constructed and arranged that good correction for such off-axis aberrations as oblique spherical aberration may be readily obtained in the system.

Another object of the present invention is to provide a lens system of the above type suitable, for example, as a photographic objective or as a projection system for motion picture or television projectors and such other uses as require good image definition and relatively high numerical apertures.

A further object is to provide a novel lens system wherein high numerical apertures are achieved with a reduced number of components, reduced lens curvatures, increased manufacturing tolerances, and improved definition as compared with other lens systems having similar numerical apertures.

Still another object is to provide a lens system comprising a plurality of spheric refracting surfaces, an aspheric surface correcting the spherical aberration contributed to the system by said spheric surfaces and one or more additional spheric refracting surfaces which converge the light and in some instances have little or no effect on the spherical aberration of the system as a whole, the presence of said last-named surface or surfaces contributing substantially to the diminution of the off-axis aberrations, particularly the oblique spherical aberration of the system.

Still another object of the present invention is to provide a novel lens system of the above type wherein one or more lens components may be formed of an optical medium having the optical characteristics obtainable in transparent organic resins such as polystyrene and polycyclohexyl methacrylate.

Other objects of the invention will in part be obvious and will in part appear hereinafter.

The invention accordingly comprises the product possessing the features, properties and relation of components which are exemplified in the following detailed disclosure and the scope of the application of which will be indicated in the claims.

Figure 2:
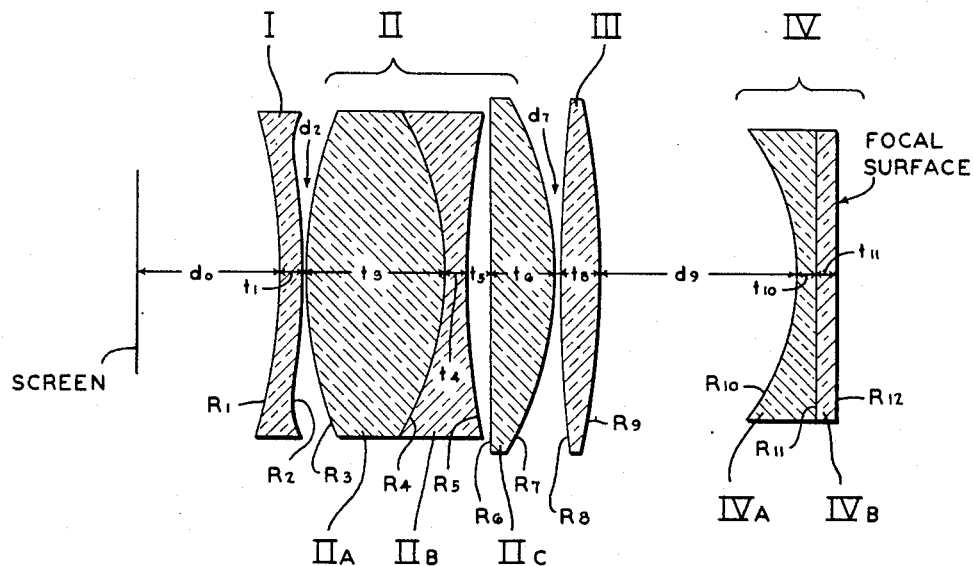
Figure 3:
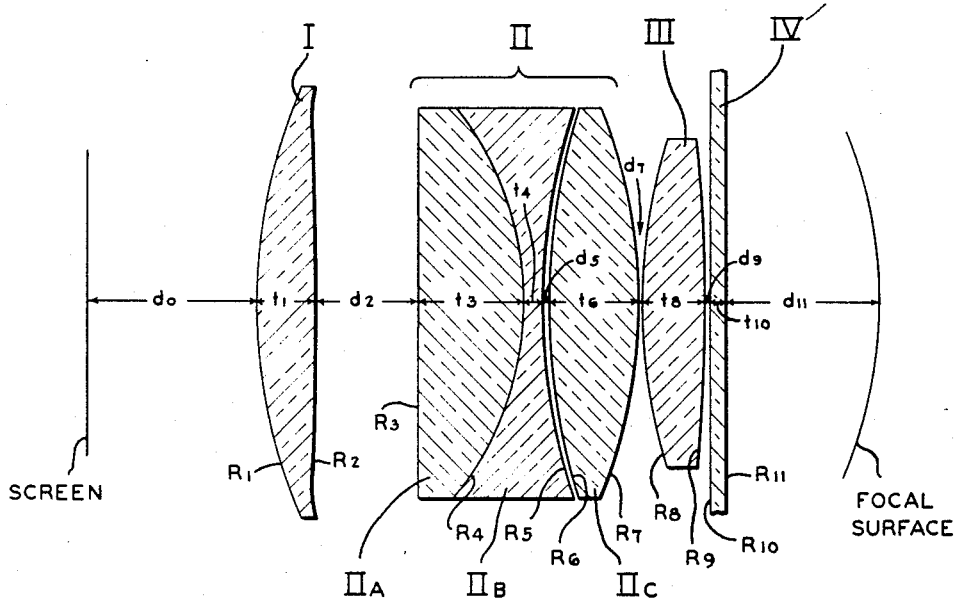

For a fuller understanding of the nature and objects of the invention, reference should be had to the following detailed description taken in connection with the accompanying drawings wherein Figures 1, 2 and 3 are diagrammatic views illustrating three embodiments of the lens system comprehended by the present invention and setting out the specific constructional data for preferred embodiments thereof.

The novel lens system comprehended by the present invention is suitable, for example, as a photographic objective or as a projection system for projecting televised images, and in one preferred form comprises a plurality of centered spheric surfaces and one aspheric surface which corrects the spherical aberration of the system as a whole. A novel characteristic of the arrangement and construction of these surfaces resides in the approximate imaging of the centers of curvature of at least two of said spheric surfaces at the aspheric surface. By virtue of this novel construction, it is possible in the lens systems herein described to correct for oblique and off-axis aberrations to such an extent that the same are within tolerance limits.

It has heretofore been proposed to construct lens systems composed of two refracting surfaces having a common geometric center of curvature and to correct the spherical aberration of the system as a whole by an aspheric surface located at the common physical or geometric centers of curvature of said refracting surfaces. These prior systems, however, have been limited in utility and efficiency in at least two important respects. They do not embody refracting surfaces having appreciable power in converging light and no appreciable contribution to spherical aberration. Furthermore, it is not possible to embody negative lenses other than meniscus lenses in these prior art systems. As a result of the first structural limitation, it is impossible to employ refracting surfaces which might have a considerable effect on the diminution of off-axis aberrations and because of the second structural limitation these systems, which have their surfaces physically centered at the aspheric surface, are inherently limited with respect to the size of aperture that can be obtained. The limitation is reached when the positive component becomes a hemisphere and occurs at approximately f/1.0, the exact limit depending, of course, on the optical materials used.

As pointed out above, the lens system of the present invention differs structurally from these prior art systems in that the centered spheric refracting surfaces which contribute substantially to the spherical aberration of the system are so constructed that their centers of curvature are imaged rather than physically located approximately at a common point, which point coincides approximately with the aspheric correcting surface. In other words, instead of so constructing the system as to have the geometric or physical centers of curvature of the spheric refracting surfaces located approximately at the aspheric surface, the lens system of the present invention may have the physical or geometric centers of curvature of the spheric surfaces thereof which contribute materially to the spherical aberration located at points substantially separated from one another and from the aspheric surface, provided only that said surfaces have their centers imaged approximately at the aspheric surface.

It is understood that the expression "center of curvature of said surface being imaged approximately at the aspheric surface," as employed in connection with the novel system of the invention, defines a spherical curvature such that a line perpendicular to the spheric surface in question at a point near the optic axis of the system, if traced as a light ray from said spheric surface through the several refracting surfaces between said spheric surface and the aspheric surface, will be caused to follow a path which intersects the optic axis of the lens system at approximately the point where the aspheric surface coincides with said optic axis.

Several advantages result from a construction of the character herein employed. First, it is possible to employ in the system one or more refracting surfaces which converge the light and have little or no spherical aberration but which have appreciable effects on the off-axis aberration, said surface or surfaces being used to improve the efficiency of the system as a whole. Moreover, because negative elements other than meniscus elements may be employed in the system, and because a plurality of positive components may be used therewith, lower aperture numbers can be achieved than are possible in a system having refracting surfaces physically centered at the aspheric surface. For example, it is theoretically possible to obtain in the present systems extremely large apertures. Although apertures, for example, greater than f/.65 may be theoretically obtained in the system of the present invention, as a general rule apertures in excess of f/.65 will give a depth of focus so small as to be impractical for ordinary photographic or projection uses.

A principal aberration suffered by lens systems whose aberrations are corrected only by mechanical centering of the spherical lenses with respect to the aspheric surface, but which may be confined to close limits in the lens system of the present invention is the aberration referred to as "oblique spherical aberration" or "variation of spherical aberration with angle." This aberration has been considered and treated in detail for the lens systems commonly referred to as "Schmidt cameras" in which an aspheric surface is located at the center of curvature of a concave mirror. It is proportional, among other things, to the sum of the products of the amount of spherical aberration at each refracting surface and the square of the inclination of the chief ray to the optical axis in passing through said refracting surface, the sum being taken over all surfaces with centers of curvature at the aspheric surface and with spherical aberration corrected by the aspheric surface.

The present invention provides means for reducing both terms in the product, i. e., the amount of spherical aberration at each surface and the inclination of the chief ray to the optic axis at each surface. Further reduction of oblique spherical aberration may be obtained in the systems of the present invention by small departures from imaging the center of curvature of the surfaces at the aspheric surface. Thus, in the present invention, all of the off-axis aberrations except one may be theoretically reduced to extremely small, i. e., negligible, values, and the remaining off-axis aberration, which is the "oblique spherical aberration," may be reduced substantially by reducing the amount of spherical aberration to be corrected at each surface by reducing the inclination of the chief ray to the optic axis at each surface and by slight departures from imaging the center of curvature at the corrector plate.

The reduction of the spherical aberration at each surface and the reduction of the inclination of the chief ray to the optic axis at each surface is the result of the novel construction of applicant's system wherein, in addition to a plurality of refracting spheric surfaces having their centers of curvature imaged at an aspheric surface, there is provided at least one further refracting surface which contributes substantially to the power of the system, i. e., to the extent of carrying at least one-tenth of the power of the system, and which has a center of curvature imaged at a point substantially spaced from the aspheric surface. Thus, a system formed in this manner inherently possesses oblique spherical aberration of a lower order than the oblique spherical aberration existing in a geometrically centered system. As a result, a small diminution of residual oblique spherical aberration produces an appreciable percentage of diminution or reduction in the total oblique spherical aberration, whereas in the geometrically centered system a similar absolute diminution in the oblique spherical aberration will result in only a small percentage diminution of the total oblique spherical aberration. Accordingly, only slight departures from imaging the refractive surfaces at the aspheric surface in the system of the present invention will give an appreciable percentage diminution of oblique spherical aberration.

Because it is desirable at times to depart somewhat from exact imaging at the aspheric surface, the term "imaged approximately at the aspheric surface" as used herein is intended to include both an imaging at said surface and limited departures from coincidence with said surface. The extent of departure of the imaged center of curvature from the aspheric surface is most conveniently expressed as a ratio wherein the antecedent is the equivalent displacement of the imaged center of curvature from the aspheric surface, and the consequent is the focal length of the system. The equivalent displacement is the displacement of the imaged center from the aspheric center which would occur if the optical medium present throughout the intervening distance had an index of 1. If the displacement distance includes a medium of index greater than 1, the displacement is converted to an equivalent displacement in a medium of index of 1; that is, if the displacement lies in whole or in part in a medium of index N, the part of the displacement occurring in the medium of index N is to be divided by N in computing the equivalent distance. The term "imaged approximately at the aspheric surface" as used herein is intended to include such departures from coincidence as will appreciably reduce the percentage of oblique spherical aberration in the system. For the purpose of this definition, the quantitative upper limit for such departures may be considered to be 0.35 F, i. e., the definition is intended to cover equivalent displacements from imaging up to 0.35 F where F is the focal length of the system. Moreover, the terms "equivalent distance" and "equivalent displacement" as used herein to describe a separation of two points in the optic axis refer to the separation in terms of its length if occurring in an optical medium having an index of refraction of 1.

In the lens system as above described, the Petzval sum is necessarily positive, and if the lens system is free from astigmatism, the field will be curved towards the lens. Two methods of overcoming this curvature of field may be employed. For example, where the requirement is that only a small or moderate angular field be covered or where there is no need for the aberration at the edge of the field to be as well corrected as near the center of the field, the field of the lens may be flattened by the use of astigmatism without reduction of the Petzval sum. Overcorrection of astigmatism may be obtained from the surfaces whose centers of curvature are not approximately imaged at the aspheric surface since a convex surface used in converging light may have a considerable contribution of astigmatism of the desired sign necessary to overcome the Petzval curvature.

One example of a lens system constructed in accordance with the principles of the present invention wherein the field is flattened by introduction of astigmatism is illustrated by way of example in Fig. 1. This lens system, in the form illustrated, comprises an aspheric correcting lens I, a plano-convex compound lens II whose curved surface $R_6$ has its center of curvature imaged approximately at the corrector plate, said lens converging the light entering the lens system before incidence upon a third lens III bi-convex in form and essentially in contact with lens II, the second surface $R_8$ of said lens III being imaged approximately at aspheric surface $R_2$ of lens I. The first surface $R_7$ of said lens III has its radius of curvature so chosen in relation to the index of refraction thereof and the object distance at that surface that said first surface $R_7$ has an appreciable amount of astigmatism of a sign as will overcome the Petzval curvature of the system. If the spacing between the lens II and lens III were large, lens III alone could be made to introduce enough astigmatism to flatten the field. However, if such were the case lens III would not be efficient in contributing to convergence of the light and would not sufficiently well achieve the primary desired effect of reducing the spherical aberration to be corrected by the aspheric surface with consequent reduction in variation of oblique spherical aberration. Accordingly, the preferred embodiment of a lens system of this type contains another lens IV which is shown as a positive meniscus lens in approximate contact with the lens III and having a convex first surface $R_9$ which also contributes astigmatism of the sign desired for overcoming the Petzval curvature. The second surface $R_{10}$ of lens IV is preferably concave and its center of curvature is imaged approximately at the aspheric surface. Lenses II and IV have been compounded for purposes of achromatization, lens II consisting of three components IIA, IIB and IIC and lens IV consisting of two components IVA and IVB.

It is to be understood that the aspheric surface $R_2$ of the above system could be the first surface $R_3$ of complex lens II if the thickness of lens element IIA were increased, in which event it would be unnecessary to embody a special lens element I to carry the aspheric surface of the system. Thickness $t_3$ would have to be increased approximately by an amount equal to the product of the distance $d_2$ and the index of refraction of lens element IIA. This is a less desirable arrangement because of the manufacturing difficulties in handling a lens of this thickness and construction.

It is noted also that the lens I which provides the aspheric surface has the first surface thereof, that is, the nonaspheric surface, curved slightly. This curvature has no appreciable effect on the power or correction of the system, but is selected in order to facilitate the design of the system, permitting easier ray tracing. The actual radius of curvature chosen is such as will make the algebraic manipulations in computing the aspheric surface more simple. The exact radius of curvature is in no respect critical to the invention. It could as readily be plano or slightly convex. This is true also of surface $R_3$ of lens II.

It is also to be understood in connection with the above-described embodiment that lens II as well as lens IV of the system may be either biconvex, meniscus or plano-convex. It is noted, for example, that lens IV of the above-described system is a positive meniscus lens and that although the rear concave surface thereof has its center of curvature imaged at the aspheric surface, its physical center of curvature is located in the direction opposite to the location of lens I.

Other applications of the lens system of the invention may require relatively large angular fields or better definition at the edge of the field, in which event the Petzval sum may be reduced to a small value approaching zero by the introduction of a negative lens approximately planoconcave in form, with the approximate plano surface thereof lying approximately in the focal plane of the lens and with a steep concave surface foremost. In this case, only a very small amount of astigmatism or none at all is required to obtain flatness of field. One such system is shown by way of example in Fig. 2 wherein a field flattener lens IV is provided.

In cases of extremely large angular field, a field flattener which corrects third order curvature of field will usually overcorrect fifth order curvature of field. This overcorrection of curvature of field near the edge of the field may be reduced or overcome by either or both of two means. One of said means is to aspherically deform the field flattener lens so that at the edge thereof it is a weaker negative lens than before deformation. This may be accomplished by deforming the curvature of either or both surfaces of the lens, and in the form shown in Fig. 2 the aspheric concave surface $R_{10}$ of lens IV has its edges of lesser curvature than the center. The other means is to so arrange the lens components preceding the field flattener that the spherical aberration of the chief ray in passing from the center of the aspheric surface to the image of the center of the aspheric surface as seen from the field flattener lens is reduced. This reduction of spherical aberration of the chief ray is most conveniently effected by reduction of the curvature of the positive surfaces whose centers are not imaged at the corrector plate.

The lens system illustrated in Fig. 2, which embodies a field flattener lens IV, also employs both of the aforementioned means for reducing fifth and higher orders of curvature of field. Said lens system comprises an aspheric lens I, a compound positive lens II followed by a simple positive lens III and an aspheric field flattener IV. The first positive component has been compounded for the purpose of achromatization and consists of a bi-concave flint lens IIB between two positive components IIA and IIC. The spherical aberration of the chief ray has been reduced by making the radius $R_5$ of the second surface of negative component IIB steeper than the first surface $R_6$ of the positive element IIC adjacent said surface.

Lens group II is considered as one lens because, were it not for the advisability of reducing the spherical aberration of the chief ray, the three elements IIA, IIB and IIC comprising this group could be cemented to form a compound triplet. Lens systems wherein components, corresponding to lens components IIA, IIB and IIC of the above-described system, are cemented together have been designed and have proven satisfactory. Their only disadvantage over the above-described system is that the field is more curved and the higher orders of curvature of field and astigmatism are greater.

The lens system of Fig. 2 is particularly adapted to project televised images, and in the form shown the field flattener lens comprises two components IVA and IVB, the latter representing the thickness of one type of television tube with which said system may be employed. The televised image is formed on surface $R_{12}$ of component IVB.

Other applications of the invention permit the use of a field curved towards the lens. In this case and in the case where a field flattener lens is used to bring about flattening of the field, it is desirable to have little or no astigmatism. The convex surfaces whose centers of curvature are not imaged at the corrector plate and which are in converging light necessarily introduce some negative astigmatism. Otherwise, the contributions to inward distortion from these surfaces would be too great. However, the negative astigmatism caused by these surfaces can be used to advantage in permitting small departures from centering of the strongly refractive surfaces and in permitting the use of positive surfaces on the front of the first positive component and in the nonaspheric side of the aspheric lens. Both of these expedients tend to reduce the oblique spherical aberration. Decentering of the strongly refractive surfaces decreases the overcorrected oblique spherical aberration by an amount proportional to the square of the decentering and the amount of axial fifth order spherical aberration of that surface. Use of a weak convex surface on the front of the first positive component and on the spherical side of the aspheric compound reduces the oblique spherical aberration by making it possible to make all other convex surfaces in the system weaker, thus reducing the amount of spherical aberration contributed by these surfaces and, consequently, the amount of oblique overcorrected spherical aberration of the system as a whole. This follows from the fact that the oblique spherical aberration is proportional in part to the sum of the products of the amount of spherical aberration at each refracting surface and the square of the inclination of the chief ray to the optic axis in passing through said refracting surface, the sum being taken over all surfaces with centers of curvature imaged approximately at the aspheric surface. It is desirable to have the negative astigmatism to be overcome by these means increased until said means begin to contribute appreciable off-axis aberrations other than oblique spherical aberration, the amount of decentering of the strongly refractive surfaces and convexity of the first surface being terminated when the increase of other aberrations offset the reduction in oblique spherical aberration achieved.

One of the first off-axis aberrations introduced by the aforementioned decentering and convexities is the type of coma which is proportional to the field angle and the fourth and higher even powers of the aperture. It is noted here that the coma proportional to the field angle and the square of the aperture may always be made exactly zero or any desired amount other than zero by proper axial spacing of the aspheric surface. Substantially complete control of the higher orders of this type of coma may be achieved by bending the aspheric surface element. Bending of the aspheric element so that the outer portions of the aspheric surface are further forward than the inner portions of the aspheric surface produces inward higher orders of coma and may be done to reduce outward higher orders of coma. Bending of the aspheric element in the opposite direction produces outward higher orders of coma. Bending of a lens composed of spheric surfaces is, of course, known in the art and is understood to consist of changing the radius of one surface of the lens while keeping the sum of the powers of the two surfaces of the lens constant. This concept of bending may be extended to elements having an aspheric surface in accordance with the present invention by changing the radius while keeping the sum of the powers of the paraxial portions of the two surfaces of the lens constant in the bending. By this expedient, it is possible to extend the amount of decentering of the strongly refracting surfaces and the amount of power in the aforementioned convexities. Thus, the reduction of oblique spherical aberration may be continued beyond the point where linear coma becomes troublesome, up to the point where other optical aberrations begin to be large.

The aberrations which are linear in the field angle, that is, the coma mentioned above, are affected by an amount proportional to the decentering of the surface. Aberrations proportional to the square of the field angle are affected by an amount proportional to the square of the decentering of the surfaces. The aberrations proportional to the square of the field angle are third order curvatures of field and astigmatism and oblique spherical aberration. Other means for controlling the third order curvatures of field and astigmatism have been explained above, and the reduction of the oblique spherical aberration accomplished by the decentering is the desired effect of the decentering. The aberration which is proportional to the cube of the field angle is affected by an amount proportional to the cube of the displacement, and is known as variation of coma with angle. It has been found that the introduction of variation of coma with angle by the displacements and aforementioned convexities is the factor which limits the displacements and aforementioned convexities.

Fig. 3 illustrates still another embodiment of the invention, in which embodiment no field flattener is used and in which small decentering of the strongly refractive surfaces and an appreciable convexity of the first surface of the aspheric lens are used.

The lens system of Fig. 3 is closely related to that of Fig. 2, and comprises three lenses, I, II and III, respectively. Lens I has one surface $R_2$ aspheric and the other surface $R_1$ convex. Lens II is a compound triplet composed of a negative flint lens IIB between two positive crown lenses IIA and IIC similar to lens II in Fig. 2. Lens III is a biconvex element. The essential differences between the lens system of Fig. 2 and Fig. 3 arise from the use of a curved field in the lens system of Fig. 3 so that the field flattener lens is done away with. Because of the absence of the field flattener lens, the second surface of element IIB and the first surface of element IIC have essentially the same radius of curvature. To obtain a more compact system, it was found helpful to retain a slight difference between these curvatures. Otherwise, the lens II could be a completely cemented triplet. The convexity has been placed on the first surface of the aspheric lens rather than on the first surface of lens II because this configuration gives better correction for lateral color in the system of Fig. 3. The reason that the position of the convexity is different in the system of Fig. 2 as compared to that of Fig. 3 is the lateral color introduced by the field flattener lens in the former system. A thin plane parallel lens IV (Fig. 3) follows lens III and represents the surface of a type of cathode ray tube employed in some television projectors for which the optical system of Fig. 3 is particularly suited. Other than as described above, the corrections of aberration are generally obtained in the lens system of Fig. 3 by the same means as has been described at length for the lens system of Fig. 2.

Provision for achromatization may be achieved without introduction of monochromatic aberrations by splitting one or more of the positive components into a crown and flint combination in which the indices of the components are preferably substantially the same but dispersions are different, by use of one or more strong crown and flint pairs of adjacent surfaces whose centers of curvature are imaged approximately at the aspheric surface and by the use of one or more shallow crown and flint pairs of surfaces whose centers of curvature are not necessarily imaged at the aspheric surface and whose indices of refraction are not necessarily equal. Fig. 1 illustrates the use of a crown and flint pair with the same mean index of refraction and all embodiments of the invention illustrate the use of an adjacent crown and flint pair with strong surfaces approximately imaged at the aspheric surface and an adjacent crown and flint pair with weak surfaces which are imaged at a point substantially displaced from the aspheric surface. At the weak crown and flint pairs of adjacent surfaces, it is also desirable that the light be neither strongly convergent nor strongly divergent.

In Fig. 1, $R_4$ represents a strong crown and flint interface whose center of curvature is imaged approximately at the aspheric surface, $R_5$ is a shallow crown and flint interface whose center of curvature is not imaged in any proximity to the aspheric surface, and $R_{10}$ is a crown and flint interface at which the crown and flint components have substantially the same index of refraction.

In Fig. 2, $R_4$ represents a strong crown and flint interface whose center of curvature is imaged approximately at the aspheric surface and $R_5$ and $R_6$ represent a crown and flint pair of adjacent weak surfaces whose centers of curvature are not imaged at the aspheric surface.

In Fig. 3, $R_4$ represents a strong crown and flint interface having its center of curvature imaged approximately at the aspheric surface, and $R_6$ and $R_7$ represents a crown and flint pair of adjacent surfaces whose centers of curvature are imaged at points substantially spaced from the aspheric surface.

The following tables relate to the specific lens systems shown in the drawings, and are illustrative of the types of systems which have been described hereinabove in connection with the drawings. Each of the following examples is numbered to correspond with the number of the figures of the drawings to which it relates.

The column "Radius" of the tables refers to the radii of the spheric surfaces as measured in linear units, for example, millimeters.

The column designated "Thickness" refers to the thickness of the lenses, also the air gaps between lenses, as measured on the axis of the lens system, in the same linear units as those used to measure the radius. The letter "$t$" indicates lens thickness and the letter "$d$" air spaces.

The term "$N_D$" is used to designate the index of refraction of the materials for the lenses as measured for the yellow "D" line of a sodium arc.

The column "V" designates the nu value or reciprocal dispersion for the lens materials used.

*Example I*

| Lens | Radius | Thickness | $N_D$ | V |
|---|---|---|---|---|
| I | $R_1 = -23.6489$ | $t_1 = .1887$ | 1.5064 | 57.5 |
|   | $R_2 = -4.1303$ | $d_2 = .2354$ | | |
| IIA | $R_3 = \infty$ | $t_3 = .5642$ | 1.6102 | 58.6 |
|   | $R_4 = -1.2416$ | | | |
| IIB | $R_4 = -1.2416$ | $t_4 = .0894$ | 1.7206 | 29.3 |
|   | $R_5 = 3.8202$ | | | |
| IIC | $R_5 = 3.8202$ | $t_5 = .7737$ | 1.6102 | 58.6 |
|   | $R_6 = -1.8741$ | $d_6 = .0010$ | | |
| III | $R_7 = 3.4609$ | $t_7 = .2861$ | 1.6102 | 58.6 |
|   | $R_8 = -4.1386$ | $d_8 = .0010$ | | |
| IVA | $R_9 = 1.2416$ | $t_9 = .5662$ | 1.6102 | 58.6 |
|   | $R_{10} = -1.6389$ | | | |
| IVB | $R_{10} = -1.6389$ | $t_{10} = .0397$ | 1.6050 | 37.9 |
|   | $R_{11} = 13.9895$ | $d_{11} = .5232$ | | |

The lens system having the above components is best suited for use as a camera lens and has an aperture of approximately f/.65 and is adapted to focus an object image located at a distance of 23.6 units from the foremost surface of element I onto a focal plane located .52 unit from surface $R_{11}$. $R_2$ gives the radius of the aspheric surface at the vertex thereof, i. e., the point of coincidence with the optic axis. The equation of the aspheric surface whereby the complete contour thereof may be determined is $$y = .121057x^2 - .161496x^4 - .067237x^6 - .04849x^8 - .009495x^{10}$$

where $y$ is the distance from the axis of a point on the surface and $x$ is the distance of this point from a plane tangent to the vertex, $x$ being positive when the point lies toward the object from the tangent plane.

*Example II*

| Lens | Radius | Thickness | $N_D$ | V |
|---|---|---|---|---|
| I | $R_1 = -1.5067$ | $t_1 = .0500$ | 1.5104 | 56 |
|   | $R_2 = -1.9240$ | $d_2 = .0125$ | | |
| IIA | $R_3 = 1.1067$ | $t_3 = .3627$ | 1.5104 | 56 |
|   | $R_4 = -.7720$ | | | |
| IIB | $R_4 = -.7720$ | $t_4 = .0563$ | 1.6000 | 33 |
|   | $R_5 = 2.1197$ | $d_5 = .0663$ | | |
| IIC | $R_6 = \infty$ | $t_6 = .1751$ | 1.5104 | 56 |
|   | $R_7 = -.9333$ | $d_7 = .0125$ | | |
| III | $R_8 = 3.7897$ | $t_8 = .1126$ | 1.6153 | 58.6 |
|   | $R_9 = -2.2738$ | $d_9 = 1.0510$ | | |
| IVA | $R_{10} = -.5940$ | $t_{10} = .0500$ | 1.6000 | 33 |
|   | $R_{11} = \infty$ | | | |
| IVB | $R_{11} = \infty$ | $t_{11} = .0529$ | 1.5100 | 56 |
|   | $R_{12} = \infty$ | | | |

The above lens system is particularly suited for use as a television projection system, being adapted to project an image from the plane of $R_{12}$ onto a screen separated from $R_1$ a distance of 7.7982 units, magnifying said image approximately 5.9 times. $R_2$ gives the radius of the aspheric surface of lens I at its vertex and the entire surface may be plotted from the curve $$y = .259876x^2 - .413152x^4 - .442134x^6 - .723725x^8$$

$R_{10}$ gives the radius of the aspheric surface of lens component IVA at its vertex, and the equation for this aspheric surface is $$y = .841703x^2 - .460142x^4$$

This lens system has an aperture of approximately f/1.2.

*Example III*

| Lens | Radius | Thickness | $N_D$ | V |
|---|---|---|---|---|
| I | $R_1 = 1.3825$ | $t_1 = .1546$ | 1.5104 | 56 |
|   | $R_2 = -4.9540$ | $d_2 = .2735$ | | |
| IIA | $R_3 = \infty$ | $t_3 = .2853$ | 1.5104 | 56 |
|   | $R_4 = -.7822$ | | | |
| IIB | $R_4 = -.7822$ | $t_4 = .04756$ | 1.6000 | 33 |
|   | $R_5 = 1.5853$ | $d_5 = .02021$ | | |
| IIC | $R_6 = 1.6513$ | $t_6 = .2342$ | 1.6153 | 58.6 |
|   | $R_7 = -1.3211$ | $d_7 = .01189$ | | |
| III | $R_8 = 1.4325$ | $t_8 = .1641$ | 1.5104 | 56 |
|   | $R_9 = -4.2462$ | $d_9 = .01189$ | | |
| IV | $R_{10} = \infty$ | $t_{10} = .03567$ | | |
|   | $R_{11} = \infty$ | $d_{11} = .7005$ | 1.500 | 56 |

The above lens system is particularly suited for use as a television projection system and is adapted to project an image located at focal sursafe $R_{12}$ onto a screen located 6.2576 units in front of lens element I, the magnification thus obtained being approximately 5.95. $R_2$ gives the radius of curvature of the aspheric surface at its vertex and the equation of the entire surface is $$y = .100929x^2 - .299968x^4 - .029642x^6 - .082767x^8$$

The radius of the focal surface, that is, $R_{12}$, is equal to 1.1370. The aperture of the above system is approximately f/.95.

The term "lens" as used in the claims is to be understood to refer to simple and complex lenses, that is a lens comprising one or a plurality of components, and the term "component" is intended to refer to a simple lens or a single one of the several lens elements which comprises a complex lens. In Fig. 1, for example, II represents a lens that is compounded and each of IIA, IIB and IIC are components thereof.

The term "imaged" as used herein to locate the center of curvature of a surface with respect to a point on the optic axis of the system is understood to imply that a ray passing through that point and being at a small inclination to the optic axis when passing through that point will intersect said surface orthogonally.

Since certain changes may be made in the above product without departing from the scope of the invention herein involved, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A lens system capable of having relatively high apertures and being suitable for use as a photographic objective, a projection system and the like, comprising, in combination, a plurality of lenses, one of said lenses having an aspheric surface, said lenses including two positive lenses, components of said positive lenses having at least two spheric refracting surfaces whose centers of curvature are imaged approximately at said aspheric surface, the physical center of curvature of at least one of said surfaces being located a substantial distance from said aspheric surface, and a third spheric refracting surface interposed between said first-named two spheric surfaces, said third surface having its center of curvature imaged at a point a substantial distance from said aspheric surface, each of said spheric surfaces being located on the same side of the aspheric surface, said side being the side nearest the shorter conjugate focus of the lens system, said aspheric surface correcting the spherical aberration of the system as a whole and said third spheric surface correcting the system at least in part for at least one of the oblique aberrations thereof and contributing to the power of the system, all spheric surfaces of the components of said lenses which have large coefficients of spheric aberration having their centers of curvature imaged approximately at said aspheric surface.

2. A lens system capable of having relatively high apertures and being suitable for use as a photographic objective, a projection system and the like, comprising, in combination, a plurality of lenses, one of said lenses having an aspheric surface, said lenses including two positive lenses, components of said positive lenses having at least two spheric refracting surfaces whose centers of curvature are imaged approximately at said aspheric surface, the physical center of curvature of at least one of said surfaces being located a substantial distance from said aspheric surface, and a third spheric refracting surface interposed between said first-named two spheric surfaces, said third surface having its center of curvature imaged at a point a substantial distance from said aspheric surface and also having its physical center of curvature spaced a substantial distance from said aspheric surface, each of said spheric surfaces being located on the same side of the aspheric surface, said side being the side nearest the shorter conjugate focus of the lens system, said aspheric surface correcting the spherical aberration of the system as a whole and said third spheric surface correcting the system at least in part for at least one of the oblique aberrations thereof and contributing to the power of the system, all spheric surfaces of the components of said lenses which have large coefficients of spheric aberration having their centers of curvature imaged approximately at said aspheric surface.

3. A lens system capable of having relatively high apertures and being suitable for use as a photographic objective, a projection system and the like, comprising, in combination, a plurality of lenses, one of said lenses providing an aspheric surface, said lenses including two positive lenses, components of said positive lenses having a pair of strongly refracting spheric surfaces, and a third spheric surface located between said first-named two spheric surfaces and having its center of curvature imaged at a point separated from said aspheric surface by an equivalent displacement substantially greater than 0.35 times the focal length of the system, said third spheric surface reducing the amount of spherical aberration at other surfaces of the system by carrying at least one-tenth of the power of the system, the centers of curvature of said first-named two spheric surfaces being imaged at a point displaced a distance from the aspheric surface sufficient to effect a substantial percentage reduction in the oblique spherical aberration of the system, said last-named displacement measured as an equivalent displacement being less than 0.35 times the focal length of the system, each of said spheric surfaces being located on the same side of said aspheric surface, said side being the side nearest the shorter conjugate focus of the lens system, all spheric surfaces of the components of said lenses which have large coefficients of spheric aberration having their centers of curvature imaged approximately at said aspheric surface, the sum of the powers of the spheric surfaces whose centers of curvature are imaged approximately at said aspheric surface being less than the power of the lens system as a whole.

4. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface, and at least a third spheric surface interposed between said two first-named spheric surfaces and contributing substantially to the power of the system, said aspheric surface correcting the spherical aberration of the system as a whole, said lenses comprising a lens providing one of said two first-named spheric surfaces and a bi-convex lens providing the second of said two first-named spheric surfaces and said third spheric surface, all spheric surfaces of the components of said lenses which have large coefficients of spheric aberration having their centers of curvature imaged approximately at said aspheric surface.

5. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface, and at least a third spheric surface interposed between said two first-named spheric surfaces and contributing substantially to the power of the system, said aspheric surface correcting the spherical aberration of the system as a whole, said lenses comprising a lens providing one of said two first-named spheric surfaces and a simple bi-convex lens providing the second of said two first-named spheric surfaces and said third spheric surface, all spheric surfaces of the components of said lenses which have large coefficients of spheric aberration having their centers of curvature imaged approximately at said aspheric surface.

6. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising an achromatized compound lens providing one of said two first-named spheric surfaces and a bi-convex simple lens providing the second of said two first-named spheric surfaces and said third spheric surface, all spheric surfaces of the components of said lenses which have large coefficients of spheric aberration having their centers of curvature imaged approximately at said aspheric surface.

7. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising an achromatized compound lens providing one of said two first-named spheric surfaces and a bi-convex simple lens providing the second of said two first-named spheric surfaces and said third spheric surface, said compound achromatized lens comprising three lens components, all spheric surfaces of the components of said lenses which have large coefficients of spheric aberration having their centers of curvature imaged approximately at said aspheric surface.

8. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising an achromatized compound lens providing one of said two first-named spheric surfaces and a bi-convex simple lens providing the second of said two first-named spheric surfaces and said third spheric surface, said compound achromatized lens comprising three lens components, two of said lens components being positive lenses and the third component a meniscus negative lens located between said positive lenses, all spheric surfaces of the components of said lenses which have large coefficients of spheric aberration having their centers of curvature imaged approximately at said aspheric surface.

9. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising an achromatized compound lens providing one of said two first-named spheric surfaces and a bi-convex simple lens providing the second of said two first-named spheric surfaces and said third spheric surface, said compound achromatized lens comprising three lens components and having a pair of adjacent crown and flint surfaces approximately imaged at the aspheric surface and another pair of adjacent crown and flint surfaces of relatively weaker curvature than said first-named crown and flint surfaces imaged at a point substantially displaced from the aspheric surface, all spheric surfaces of the components of said lenses which have large coefficients of spheric aberration having their centers of curvature imaged approximately at said aspheric surface.

10. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising, in the order named, an aspheric correcting lens, an achromatized compound lens providing one of said two first-named spheric surfaces, and a bi-convex simple lens providing the second of said two first-named spheric surfaces and said third spheric surface, said two last-named lenses being substantially in contact with one another, the surface of said bi-convex lens adjacent to said compound lens constituting the said third spheric surface and having an appreciable amount of astigmatism of a sign such that it overcomes at least in part the Petzval curvature of the system, all spheric surfaces of the components of said lenses which have large coefficients of spheric aberration having their centers of curvature imaged approximately at said aspheric surface.

11. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising, in the order named, an aspheric correcting lens providing the aspheric surface, an achromatized compound lens having an approximately plano surface adjacent said aspheric lens and having one of said two first-named spheric surfaces as the other surface thereof, a simple bi-convex lens providing the other of said two first-named spheric surfaces and said third spheric surface, and a compound achromatized positive lens, all spheric surfaces of the components of said lenses which have large coefficients of spheric aberration having their centers of curvature imaged approximately at said aspheric surface.

12. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising, in the order named, an aspheric correcting lens providing the aspheric surface, an achromatized compound lens having an approximately plano surface adjacent said aspheric lens and having one of said two first-named spheric surfaces as the other surface thereof, a simple bi-convex lens providing the other of said two first-named spheric surfaces and said third spheric surface, and a compound achromatized positive lens, said three last-named lenses being substantially in contact with one another, all spheric surfaces of the components of said lenses which have large coefficients of spheric aberration having their centers of curvature imaged approximately at said aspheric surface.

13. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising a simple lens providing said aspheric surface, a compound achromatized lens providing one of said two first-named spheric surfaces, a simple lens providing the other of said two first-named spheric surfaces and said third spheric surface, and a field flattener lens, all spheric surfaces of the components of said lenses which have large coefficients of spheric aberration having their centers of curvature imaged approximately at said aspheric surface.

14. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising a simple lens providing said aspheric surface, a compound achromatized lens providing one of said two first-named spheric surfaces, a simple lens providing the other of said two first-named spheric surfaces and said third spheric surface, and a field flattener lens having one face thereof substantially in the focal plane of the system, all spheric surfaces of the components of said lenses which have large coefficients of spheric aberration having their centers of curvature imaged approximately at said aspheric surface.

15. A lens system capable of having relatively high apertures and being suitable for use as a photographic objective, a projection system, and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising a simple lens providing said aspheric surface, a compound achromatized lens providing one of said two first-named spheric surfaces, a simple lens providing the other of said two first-named spheric surfaces and said third spheric surface, and a field flattener lens, said field flattener lens being in a substantially plano-concave lens having its approximate plano surface lying in the focal plane of the lens system, all spheric surfaces of the components of said lenses which have large coefficients of spheric aberration having their centers of curvature imaged approximately at said aspheric surface.

16. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising a simple lens providing said aspheric surface, a compound achromatized lens providing one of said two first-named spheric surfaces, a simple lens providing the other of said two first-named spheric surfaces and said third spheric surface, and a field flattener lens, said field flattener lens being aspherically deformed to cause the edges thereof to have weaker lens effect whereby overcorrections of fifth orders of curvature of field are at least in part reduced all spheric surfaces of the components of said lenses which have large coefficients of spheric aberration having their centers of curvature imaged approximately at said aspheric surface.

17. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising, in the order named, an aspheric correcting lens providing the aspheric surface, an achromatized compound lens providing one of said two first-named spheric surfaces, and a biconvex simple lens providing the second of said two first-named spheric surfaces and said third spheric surface, all spheric surfaces of the components of said lenses which have large coefficients of spheric aberration having their centers of curvature imaged approximately at said aspheric surface.

18. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising, in the order named, an aspheric correcting lens providing the aspheric surface, an achromatized compound lens providing one of said two first-named spheric surfaces, and a bi-convex simple lens providing the second of said two first-named spheric surfaces and said third spheric surface, said aspheric lens having the first surface thereof concave, all spheric surfaces of the components of said lenses which have large coefficients of spheric aberration having their centers of curvature imaged approximately at said aspheric surface.

19. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising, in the order named, an aspheric correcting lens providing the aspheric surface, an achromatized compound lens providing one of said two first-named spheric surfaces, and a bi-convex simple lens providing the second of said two first-named spheric surfaces and said third spheric surface, said aspheric surface being bent to reduce higher orders of coma, all spheric surfaces of the components of said lenses which have large coefficients of spheric aberration having their centers of curvature imaged approximately at said aspheric surface.

20. A lens system capable of having relatively high apertures and being suitable for use as a photographic objective, a projection system and the like, comprising, in combination, a plurality of lenses, said lenses providing an aspheric surface, a pair of strongly refracting spheric surfaces having their centers of curvature imaged approximately at said aspheric surface and at least a third spheric surface interposed between said two first-named spheric surfaces, said aspheric surface correcting the spherical aberration of the system as a whole and said third spheric surface correcting the system at least in part for at least one of the oblique aberrations thereof and contributing to the power of the system, said lenses comprising a simple lens providing said aspheric surface, a compound achromatized lens providing one of said two first-named spheric surfaces, a simple lens providing the other of said two first-named spheric surfaces and said third spheric surface, and a field flattener lens, said field flattener lens being aspherically deformed to cause the edges thereof to have weaker lens effect whereby overcorrections of fifth orders of curvature of field are at least in part reduced, said aspheric lens having the first surface thereof convex, all spheric surfaces of the components of said lenses which have large coefficients of spheric aberration having their centers of curvature imaged approximately at said aspheric surface.

DAVID S. GREY.

REFERENCES CITED

The following references are of record in the file of this patent:

UNITED STATES PATENTS

| Number | Name | Date |
| --- | --- | --- |
| 934,579 | Straubel et al. | Sept. 21, 1909 |
| 1,968,222 | Richter | July 31, 1934 |
| 2,100,291 | Lee | Nov. 23, 1937 |
| 2,170,979 | Straubel | Aug. 29, 1939 |
| 2,206,195 | Konig | July 2, 1940 |
| 2,259,004 | Schade | Oct. 14, 1941 |
| 2,289,779 | Herzberger | July 14, 1942 |
| 2,336,207 | Aklin | Dec. 7, 1943 |
| 2,377,268 | Rinia | May 29, 1945 |
| 2,380,887 | Warmisham | July 31, 1945 |

FOREIGN PATENTS

| Number | Country | Date |
| --- | --- | --- |
| 18,073 | Great Britain | of 1906 |
| 127,058 | Great Britain | May 29, 1919 |
| 616,565 | Germany | July 31, 1935 |
| 847,866 | France | July 10, 1939 |
| 557,123 | Great Britain | Nov. 4, 1943 |